(No Model.) 2 Sheets—Sheet 1.
J. C. AYER.
LOOM TEMPLE.
No. 488,916. Patented Dec. 27, 1892.
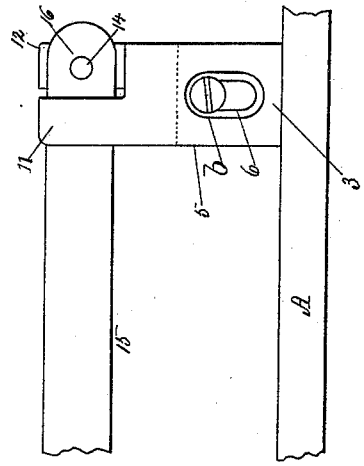
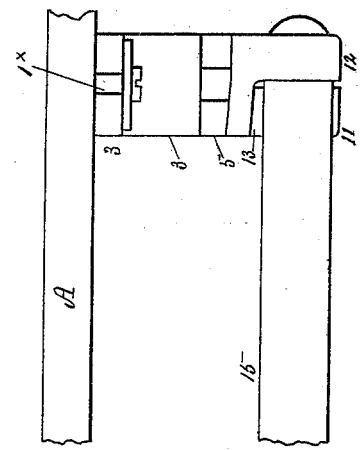
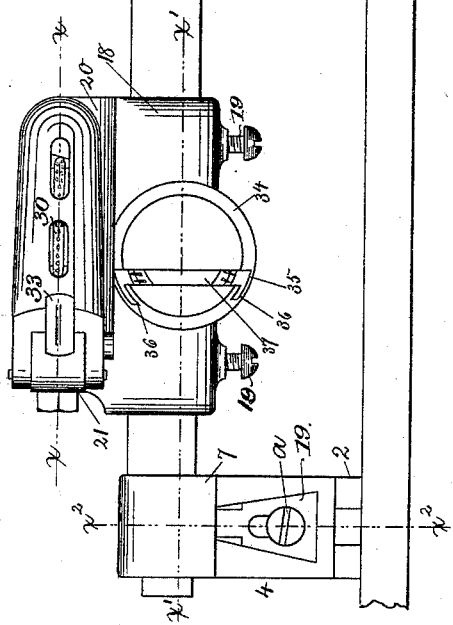
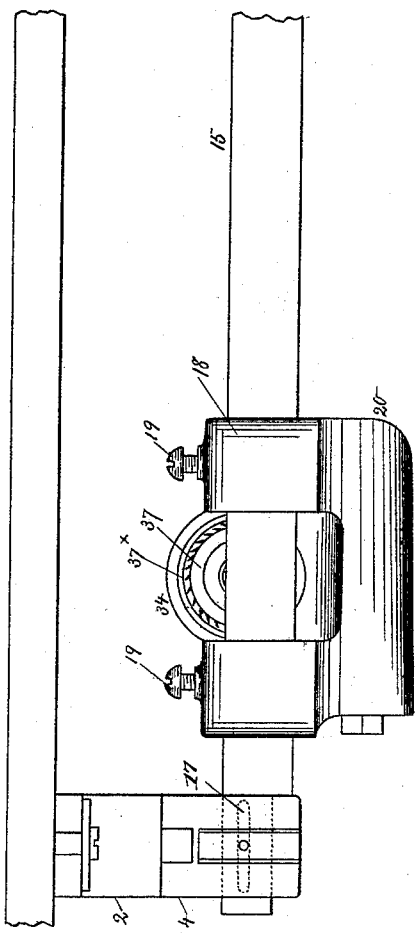
Fig. 1.
Fig. 2.
Witnesses.
Louis N. Growell
Edward F. Allen
Inventor.
John C. Ayer
by Crosby & Gregory
Attys.

(No Model.) 2 Sheets—Sheet 2.
J. C. AYER.
LOOM TEMPLE.
No. 488,916. Patented Dec. 27, 1892.
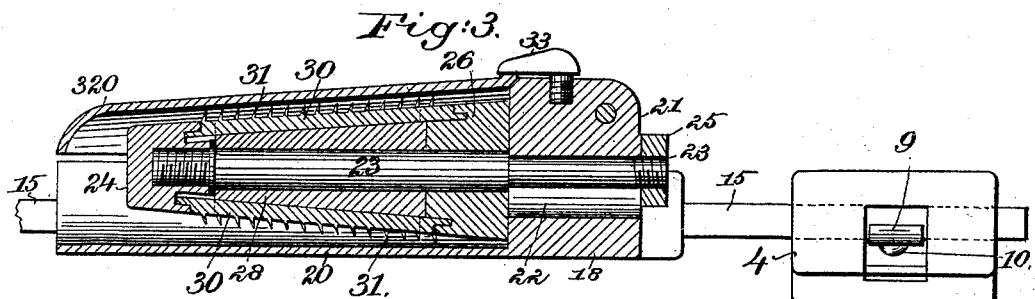
Fig. 3.
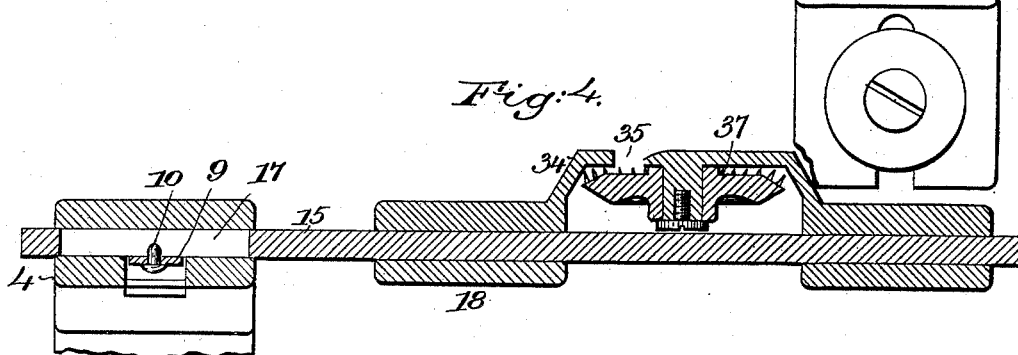
Fig. 4.
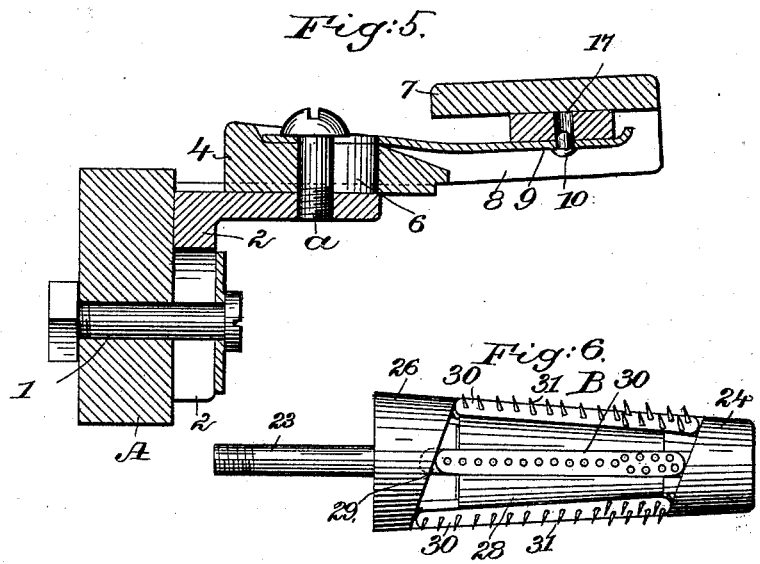
Fig. 5.
Fig. 6.
Witnesses.
Irus N. Sewell
Edward F. Allen
Inventor:
John C. Ayer
by Crosby & Gregory
attys

UNITED STATES PATENT OFFICE.

JOHN C. AYER, OF LEICESTER, ASSIGNOR TO THE DUTCHER TEMPLE COMPANY, OF HOPEDALE, MASSACHUSETTS.

LOOM-TEMPLE.

SPECIFICATION forming part of Letters Patent No. 488,916, dated December 27, 1892.

Application filed February 13, 1892. Serial No. 421,365. (No model.)

*To all whom it may concern:*

Be it known that I, JOHN C. AYER, of Leicester, county of Worcester, State of Massachusetts, have invented an Improvement in Loom-Temples, of which the following description, in connection with the accompanying drawings, is a specification, like letters and numerals on the drawings representing like parts.

This invention has for its object the production of an improved temple adapted for both light and heavy work.

In the form in which my invention is herein embodied, the main temple roll is represented as of conical form and provided at its periphery with a series of longitudinally sliding toothed bars adapted to engage and stretch the material, the sliding movements of the toothed bars being effected by cams on the axis or stud on which the temple roll rotates, the said cams being adjustably held in position so that they may be rotated about the stud and be made to occupy either of two positions about one hundred and eighty degrees apart according to the weight or character of the cloth being woven.

The temple roller referred to is free to rotate about a horizontal stud supported at one end only and located between a concaved flange and a movable concaved cover, and the cloth may be led either between the roll and flange, or between the roll and cover according to the goods being woven, the apex or crown of the cam used to slide the bars, being at the lower side of the stud when the cloth is to be passed between the roll and the flange, and at the upper side of the stud when the cloth is to be passed over the roll and between it and the cover. The cam faces referred to for sliding the toothed-bars longitudinally are both fixed to the horizontal stud and rotate with it when it is desired to adjust the temple for the cloth above or below the temple roll.

With a temple roll having its teeth adapted to travel in the direction of the length of the roll during the rotation thereof, I have combined a star wheel, the latter being arranged back of the temple roll and between it and the breast beam, and adapted to be rotated by the cloth about a substantially vertical stud or axis, the star wheel holding the cloth, previously stretched by the temple roll, in its distended state for some distance behind the temple roll, thus reducing the strain on the teeth and the power required to move them in the direction of the width of the cloth.

The temple herein to be described has been devised more especially for use in connection with looms for weaving woolen goods as in this class of work the selvage warp being less firm than in cotton goods, is frequently stretched and becomes slack, and this slack selvage frequently gives trouble, the slack occurring in the selvage and adjacent warps which are immediately engaged by the temple roll. The conical shape given to the temple roll body partially overcomes this trouble as it aids in taking up the slack in the selvage warps, but this conical roll alone would not fully eradicate the evil complained of, but by adding to the conical body the longitudinally sliding toothed-bars as contra-distinguished from toothed rings, I have been enabled to fully compensate for slack in the selvage warps. The teeth of the toothed sliding bars act more uniformly upon the cloth than do the toothed-rings.

Prior to my invention, I am not aware that a conical temple roll has ever been provided with longitudinally sliding bars, and the latter have advantages over rings set at an inclination, not only in greater steadiness of draft on the cloth, but the cost of the body of the roll and the bars is less than the cost of the cam rollers and toothed rings, and the sliding bar construction is possibly more durable.

The especial features in which my invention consists will be hereinafter more fully described and indicated in the claims at the end of the specification.

Figure 1, is a top view of a temple embodying my invention; Fig. 2, is an under side view thereof; Fig. 3, is a longitudinal section taken on the line $x$—$x$ Fig. 1, through the temple roller, and looking toward the breast beam; Fig. 4, is a sectional view on the line $x'$—$x'$ Fig. 1. Fig. 5, is a sectional view on the line $x^2$—$x^2$, Fig. 1, looking to the right; Fig. 6, is a detail view of the temple roller. The said figure, however, showing the cam faces and sliding bars so located as to act upon the cloth at the under side, rather than at the upper side of the roll, as provided for in Fig. 3 of the drawings.

To the breast beam A of the loom are secured by screws 1, 1× the L-shaped supporting brackets 2, 3, they having suitable slots to admit of their vertical adjustment on or with relation to the breast beam. To the brackets 2, 3, are secured respectively by screws $a$, $b$, the arms 4 and 5, they having suitable longitudinal slots as 6, to admit of their adjustment toward or from the breast beam. The arm 4 is provided with a flange 7, and with a slot 8, into which extends a spring 9 provided on its upper side with a lug or stud 10. The arm 5 is provided with forwardly-extending fingers 11 and 12, the latter of which is located below the plane of the former, the finger 11 having at its inner end a beveled shoulder 13, and the finger 12 an upwardly-extending lug or stud 14.

15 designates the temple bar, it being provided at one end with a perforation 16 to engage the lug or stud 14, the end of the bar being inserted between the fingers 11 and 12 of the arm 5 so as to rest upon the finger 12 and engage its upwardly-extended stud. The opposite end of the temple-bar is provided with a longitudinal slot 17, and this end of the bar rests and is held firmly upon the arm 4 under the flanged or inturned end thereof by the lug or stud 10 of the spring 9 engaging the said slot 17. By this arrangement the temple-bar is held securely in position, yet if during operation, it should be struck by any of the moving parts of the loom, damage will not be done, for the spring 9 will yield and let the temple-bar move or be forced in an outward direction, it then turning upon the lug or stud 14 as a pivot, while the slotted end of the temple-bar still remains supported upon the arm 4.

18 designates a block or casing which is provided with slotted arms whereby it may be adjustably mounted upon the temple-bar, said block or casing being also provided with set screws 19 whereby it may be secured at any desired point.

The block or casing 18 has a rearwardly-extended concave supporting flange 20, at the outer end of which, or nearest the loom side, is a lug 21 having a vertical slot 22 to receive the stud or axis 23 of the temple roller B, the stud being screw-threaded to receive a nut 25 whereby it may be secured at any desired adjustment in the vertical slot 22.

The temple-roller shown is of a tapering or conical shape and consists essentially of a central revolving sleeve 28 having longitudinal grooves 29 containing slide bars 30 having shouldered ends to engage the undercut cam-faces of the blocks 24, 26, fast on the stud 23, the said bars being provided with suitable teeth or spurs 31 which are engaged by the cloth, and as the latter in its travel rotates the roll, the bars are slid on the roll by the cam faces, thus stretching the cloth in the direction of its width. To the lug 21 is hinged a concaved cover 320 adapted to close down over the temple roller B in such a manner as to permit the cloth to pass between said cover and the roller if desired. The cloth, however, may also when desired pass under the roller, between the latter and the flange 20. When the cover is closed, it may be retained by means of a turn-button 33 pivoted to the upper side of the lug 21 and adapted to be turned over the heel end of the said cover.

When the cloth is to be passed under the roller, the apex of the cam face 24 will be at the under side of the stud, as in Fig. 6 and the apex of the cam face 26 at the lower side, but if the cloth is to be passed over the roll, then the nut 25 will be loosened and the stud 23 will be turned for one hundred and eighty degrees to bring the apex of the cam face 24 above the stud, see Fig. 3 thus enabling the bars to be moved longitudinally away from the center of the loom to, at the proper time, stretch the cloth in the proper direction.

The block or casing 18 is provided on its upper side with an enlargement 34, circular in shape and having a longitudinal slot 35 in the face thereof and horizontal notches 36. Within this enlargement of the casing is pivoted the circular star wheel or disk 37, which is slightly conical in shape and provided with upwardly extended teeth 37×. In my improved device, this star wheel acts as an auxiliary to the temple-roller, to catch the selvage of the cloth and to prevent the latter from working back against the temple-roller.

The operation of my invention will be readily understood from the foregoing description, taken in connection with the drawings hereto annexed, by those skilled in the art to which it appertains.

It is obvious that the device is to be made both right and left hand, so as to be adapted to engage either edge of the cloth.

The cloth may pass either over or under the temple-roller and from thence through the slot 35 in the enlargement 34 of the casing, so as to engage the toothed wheel 37.

The temple-bar carrying the casing with the wheel and roller may be adjusted longitudinally as well as vertically with relation to the breast beam, and owing to the method herein described of mounting the temple-bar, it will be in no danger of being injured in case it should be struck by any of the moving parts of the loom.

It will be understood that the star wheel has its teeth upwardly extended, and should the said teeth be arranged horizontally it would be impossible to effect the same results as by means of the teeth located as represented in Fig. 4.

Having described my invention, what I claim and desire to secure by Letters Patent, is:—

1. In a loom temple, a stud or axis, a rotatable bar-carrying conical shell or roll, and a series of longitudinally sliding toothed-bars, and co-operating cam faces to effect the longitudinal sliding of the sad bars, to operate substantially as described.

2. In a loom temple, a stationary stud or axis supported at but one end; a longitudinally grooved rotating sleeve mounted thereon; a series of sliding toothed bars carried by and rotating with said sleeve; and actuating cam faces or surfaces for said bars fixed to said stud and rotatable therewith in order to place the faces of the actuating cams in the proper position, combined with a flange located below, and a cover located above the said sleeve and its toothed bars, whereby the cloth may be passed as desired, either under the sleeve and between it and the said flange, or over the sleeve and between it and the cover for the purposes set forth.

3. In a loom temple, the following instrumentalities, viz:—a stud or axis; a rotatable roll; a series of longitudinally-sliding toothed bars carried thereby; two cam faces connected to said stud and adapted to slide the bars, a support for the stud or axis, a block or cover, located between the temple roll and breast beam of the loom, and a toothed or star wheel having upwardly projecting teeth and located in said cover, to operate, substantially as described.

4. A temple roll; its support during rotation; a series of longitudinally-sliding toothed-bars carried thereby, actuating cam surfaces for said bars, and a flange below and a cover above said roll, combined with a block or case located between said roll and the breast beam, and a toothed star wheel located in said case, and having upwardly directed teeth to operate, substantially as described.

5. In a temple, the combination with the vertically-adjustable supporting brackets, and the longitudinally-adjustable supporting arms, of a temple-bar connected pivotally with one of said arms, and detachably with relation to the other of said arms, substantially as set forth.

6. The arm having forwardly-extending fingers located in different planes, the upper finger being provided with a beveled shoulder at its inner end and the lower finger with an upwardly extending stud, combined with an arm having a flange on its upper side and provided with a spring extending into a longitudinal slot therein and having an upwardly-extending stud, and the temple bar supported by said arms and provided at one end with a perforation to engage the pivoted stud upon the finger of one arm and at its opposite end with a longitudinal slot adapted to be engaged by the stud extending upwardly from the holding spring within said flange, substantially as set forth.

7. The temple-bar, the block or casing having the rearwardly-extending flange and a vertically-slotted lug; the cover hinged to the latter; and an enlargement formed upon the casing and having a slot at right angles to the temple-roller and provided with lateral notches; combined with a toothed wheel mounted in the said enlargement of the casing, and having upwardly-extended teeth, substantially as and for the purpose set forth.

8. The combination of the temple-bar, the block or casing mounted adjustably thereon and having a temple-roller and the toothed wheel, having upwardly extended teeth, the latter being arranged in the casing having a slot at right angles to the temple roller, the said temple roller being mounted adjustably at one end and provided with a movable cover, substantially as set forth.

In testimony whereof I have signed my name to this specification in the presence of two subscribing witnesses.

JOHN C. AYER.

Witnesses:
GEO. W. GREGORY,
EMMA J. BENNETT.